(12) United States Patent
Grunnah (10) Patent No.: US 7,377,073 B2
(45) Date of Patent: May 27, 2008

(54) METHODS AND APPARATUS FOR SUPPORTING PLANT STEMS

(75) Inventor: Robert Grunnah, Dallas, TX (US)

(73) Assignee: Robert Grunnah, Dallas, TX (US)

( * ) Notice: Subject to any disclaimer, the term of this patent is extended or adjusted under 35 U.S.C. 154(b) by 61 days.

(21) Appl. No.: 11/380,372

(22) Filed: Apr. 26, 2006

(65) Prior Publication Data

US 2006/0236602 A1    Oct. 26, 2006

Related U.S. Application Data

(60) Provisional application No. 60/675,030, filed on Apr. 26, 2005.

(51) Int. Cl.
*A01G 9/12* (2006.01)

(52) U.S. Cl. ............................................. 47/47; 47/70

(58) Field of Classification Search .................... 47/47, 47/45, 46, 39, 70; 248/156, 545, 521, 530, 248/533, 125.7, 99; D8/1; D11/143
See application file for complete search history.

(56) References Cited

U.S. PATENT DOCUMENTS

| 3,165,863 | A | * | 1/1965 | Duran ........................... 47/47 |
| 5,606,824 | A | * | 3/1997 | Ruibal ........................... 47/70 |
| 6,209,258 | B1 | * | 4/2001 | Schneider ..................... 47/46 |
| 2002/0189163 | A1 | * | 12/2002 | Cooper ........................... 47/39 |

* cited by examiner

*Primary Examiner*—T. Nguyen
(74) *Attorney, Agent, or Firm*—Snell & Wilmer L.L.P.

(57) ABSTRACT

A plant stem support system having an adjustable base and adjustable top support assembly. The base is adjustable to optimally fit within pots or spaces between about two and six inches in diameter. The top support assembly includes a pair of curved arms that are pivotable to secure a range of plant sizes or number of plants. Anchors on the arms provide for attachment of the plant to the arms or attachment of a plant covering.

13 Claims, 9 Drawing Sheets

METHODS AND APPARATUS FOR SUPPORTING PLANT STEMS

CROSS-REFERENCE TO RELATED APPLICATIONS

The present application claims the benefit of U.S. provisional application Ser. No. 60/408,106, filed Apr. 26, 2005.

FIELD OF THE INVENTION

The present invention generally relates to gardening devices and, more particularly, to an improved device and method for supporting plant stems during plant growth.

BACKGROUND OF THE INVENTION

In order to maintain a growing plant in a generally up-right position, it is desirable to support the stem of the plant as it grows. In many plants the stem is relatively weak, and may not have sufficient strength to support the top of the plant. This can result in "floppy" or weak stems. Weak stems are of particular interest in mass-produced bulbs, which are known to have a genetic predisposition toward low-rigidity stems.

Known methods for supporting plant stems are unsatisfactory in a number of respects. For example, it is customary to place a stick or rod within the soil of a flower pot and tie the plant to the rod with a string, tape, or other fastener. Such systems do not readily accommodate the vertical and lateral growth of the plant, and can actually result in damage to the stem as the plant grows. For example, the string may cut into the stem as the plant outgrows the initial length of string. Such systems and methods also have aesthetic drawbacks, as the use of tape, string, and the like to support the plant can result in an unsightly appearance. Additionally, conventional sticks or rods may lean or tip over if the surrounding dirt is loose.

Thus, a stem support system and method are needed that overcome these and other limitations of the prior art.

SUMMARY OF THE INVENTION

In general, various embodiments of the present invention provide a convenient means for supporting plants throughout a growth cycle to prevent undue bending or breakage of the stem of the plant. Various embodiments include a support rod attached to a base having articulated links adjustable to fit a range of pot sizes. The support rod carries a pair of curved arms that are slidable along the support rod and pivotable about the support rod to clutch plants of various heights and sizes throughout the growth cycle. Economy of manufacture and convenience in use may be provided by snap-fit attachment of various system components, such as the articulated links.

In a method of use according to one embodiment, the base of the support system is adjusted according to the size of pot to be used and/or according to the size of plant to be supported. The plant is then placed over the base adjacent the support rod with the curved arms in the open position. The curved arms are then closed around the plant to provide support to the plant. The arms may be held in position by friction between the arms and support rod and additionally by string or elastics attached to anchors formed on each of the arms. The arms may then be adjusted vertically along the support rod or may be incrementally opened as the plant grows.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The following description is of exemplary embodiments of the invention only, and is not intended to limit the scope, applicability or configuration of the invention in any way. Rather, the following description is intended to provide a convenient illustration for implementing various embodiments of the invention. As will become apparent, various changes may be made in the function and arrangement of the elements described in these embodiments without departing from the scope of the invention as set forth in the appended claims.

In general, the present invention provides a system for supporting the stems of a plant (or plants) in a way that is adjustable with respect to base size (e.g., according to the diameter of pot in which the system is to be used), height, and clutch size (e.g., the number or size of stems that can be accommodated).

In various embodiments, a support rod is attached to an adjustable base and carries a pair of moveable arms to clutch the stems of a plant. The base is adjustable to fit pots of various sizes and to provide varying degrees of support to the support rod according to the respective plant and environment. For example, a broader base configuration may be desirable for bushier plants in a windy area or in loose soil. The moveable arms may be independently movable about and along the support rod and may also be configured to be deformable. The support rod may be extendible and the arms moveable to the appropriate support height for a given plant.

In various methods of use, the support system may be buried in the ground or in a pot beneath or adjacent to the plant to be supported. The support rod is attached to a base assembly that is placed in the respective planting pot or hole. The plant to be supported and proper planting soil are then placed above the base. The support system arms are then adjusted to the desired height and clutch breadth. The arms may be further secured in their respective positions. The arms may then be adjusted as the plant grows or as the plant is replaced. The soil and plant weight maintain the device in place.

Figure 1:
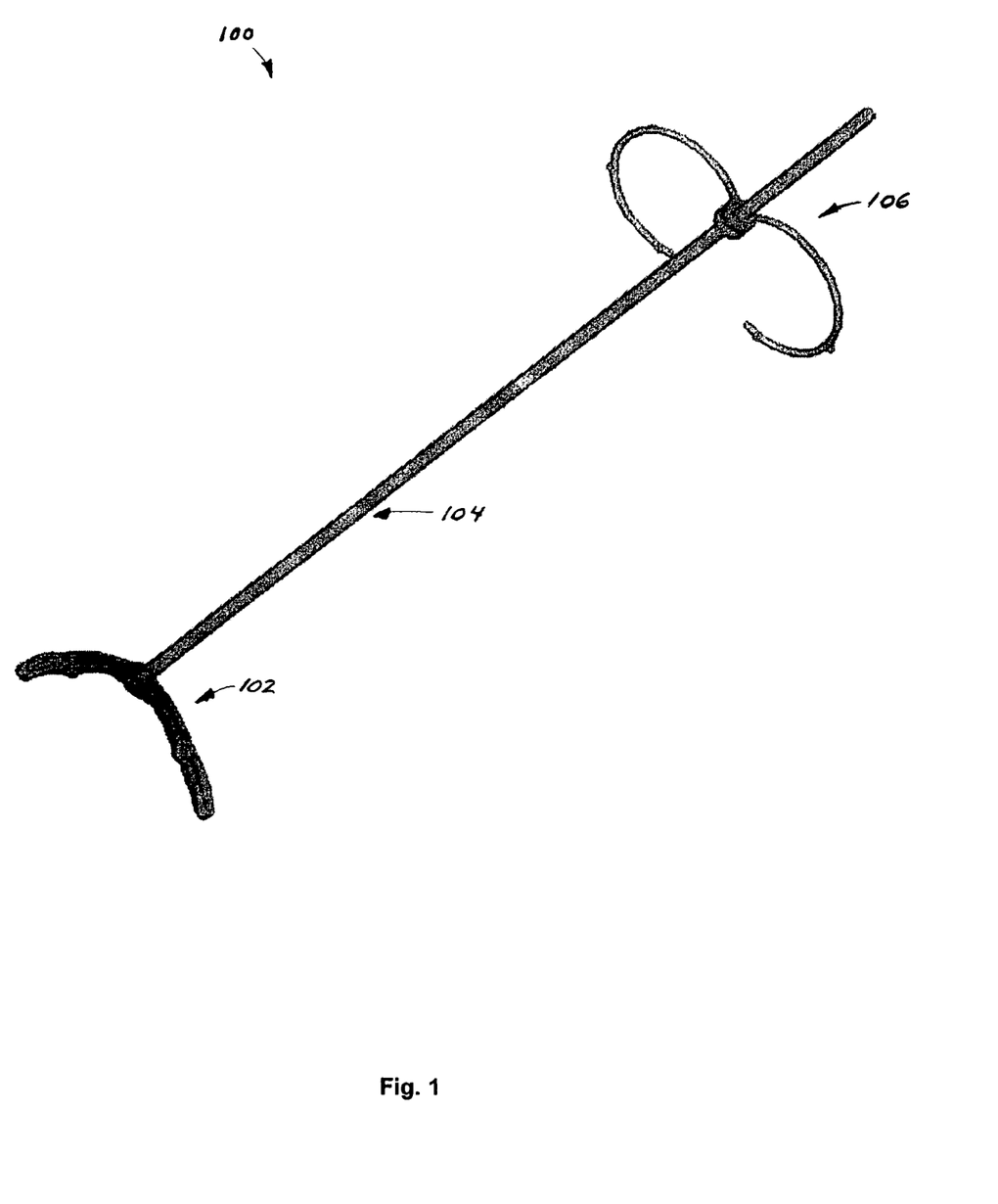
FIG. 1 illustrates a stem-support system in accordance with one embodiment of the present invention.

With reference now to FIG. 1, a stem-support system 100, in accordance with one embodiment of the present invention, comprises a support rod 102 attached at its lower end to a base assembly 104 and carrying towards its upper end a top assembly 106. Support rod 102 may be any elongated structure suitable to carry top assembly 106 and to provide additional support to the stem of a plant. Support rod 102, base assembly 104, or top assembly 106 may be constructed of one of or combination of wood, plastic, metal, fiberglass, or any other suitable material.

Base assembly 104 may be formed integral to or separately from support rod 102 or may be attached thereto by any suitable connection or fastener. Base assembly 104 may be configured simply as a buried anchor for the lower end of support rod 102 or may be configured to provide free-standing support to support rod 102. Additional segments may be added to base assembly 104 or segments may be spread out or extended to provide additional support for larger or taller plants. Base assembly 104 may include any number of arms having any number of segments and may be adjustable for use with a variety of sizes of pots, holes, or plants.

Upper assembly 106 may include any number of arms, hoops, or the like having any number of segments to entirely or partially enclose, clutch, or back any number of plants. For example, upper assembly 106 may be configured as a closed or semi-closed ring of any suitable geometry surrounding a single stem of a plant, a collection of stems of a plant, or a collection of plants.

Figure 2:
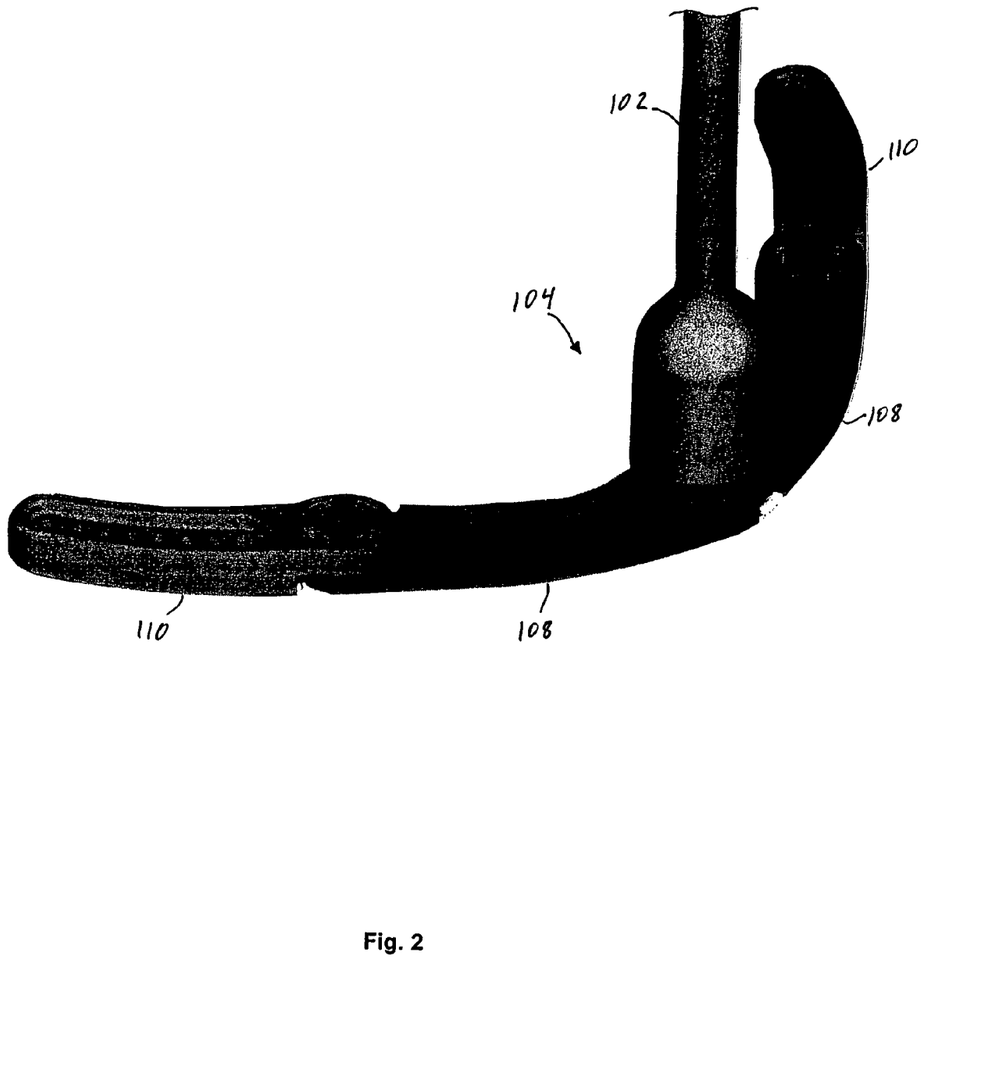
FIG. 2 illustrates an exemplary base assembly with articulated links.
Figure 3:
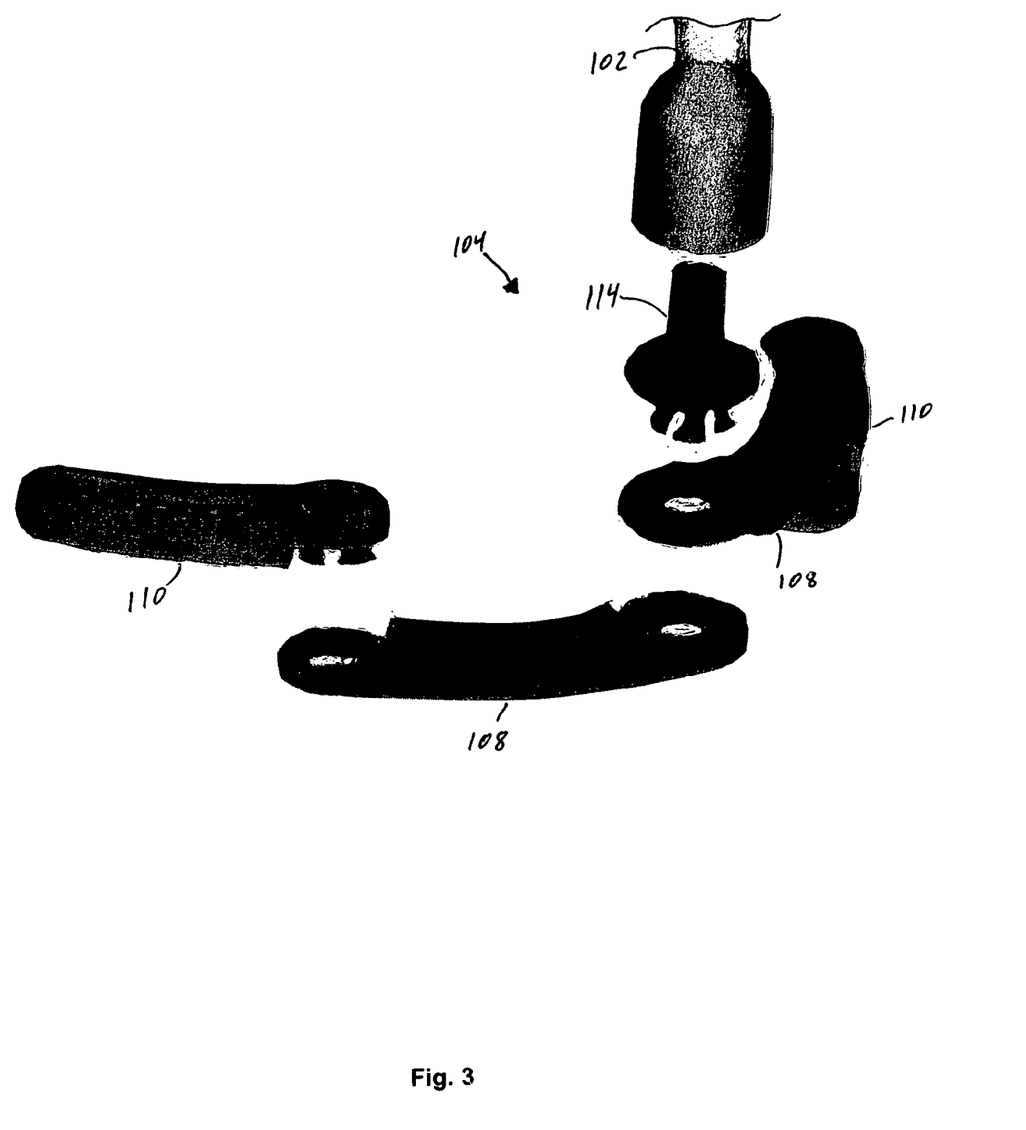
FIG. 3 illustrates the various components of an exemplary base.

In the embodiment shown in FIGS. 2 and 3, base assembly 104 comprises a plurality of inner articulated segments 108 and outer articulated segments 110 that are adjustable depending upon the pot size in which the system is to be used. In the illustrated embodiment, inner segments 108 are coupled to the lower end of support rod 102 and outer segments 110 are coupled to inner segments 108.

Inner segments 108 or outer segments 110 may be configured with offset connection points such that segment pairs may be made with a single mold design and used on either side of base assembly 104 simple by changing the orientation of the connection point. For example, in FIGS. 2 and 3, inner segments 108 may be flipped over to be interchanged between the two legs of base assembly 104. Outer segments 110 may be similarly interchanged.

The various components of base assembly 104 may be connected or fastened together by any suitable means. That being said, in FIG. 3, segments 108 and 110 are shown with a snap-fit configuration. A base post 114 may be used to couple inner segments 108 to support rod 102. Support rod 102 may be enlarged or flared at its lower end to receive base post 114. Base post 114 may alternatively be formed as an integral part of one of inner segments 108 or support rod 102. Similarly, inner segments 108 may be jointly formed, joined, or fixed as an integral unit. Support rod 102 may be fixed to or pivotable about base post 114. Inner segments 108 and outer segments 110 may be curved, straight, or faceted and may be collapsed or expanded to fill or fit within various sizes of pots or holes.

Figure 4:
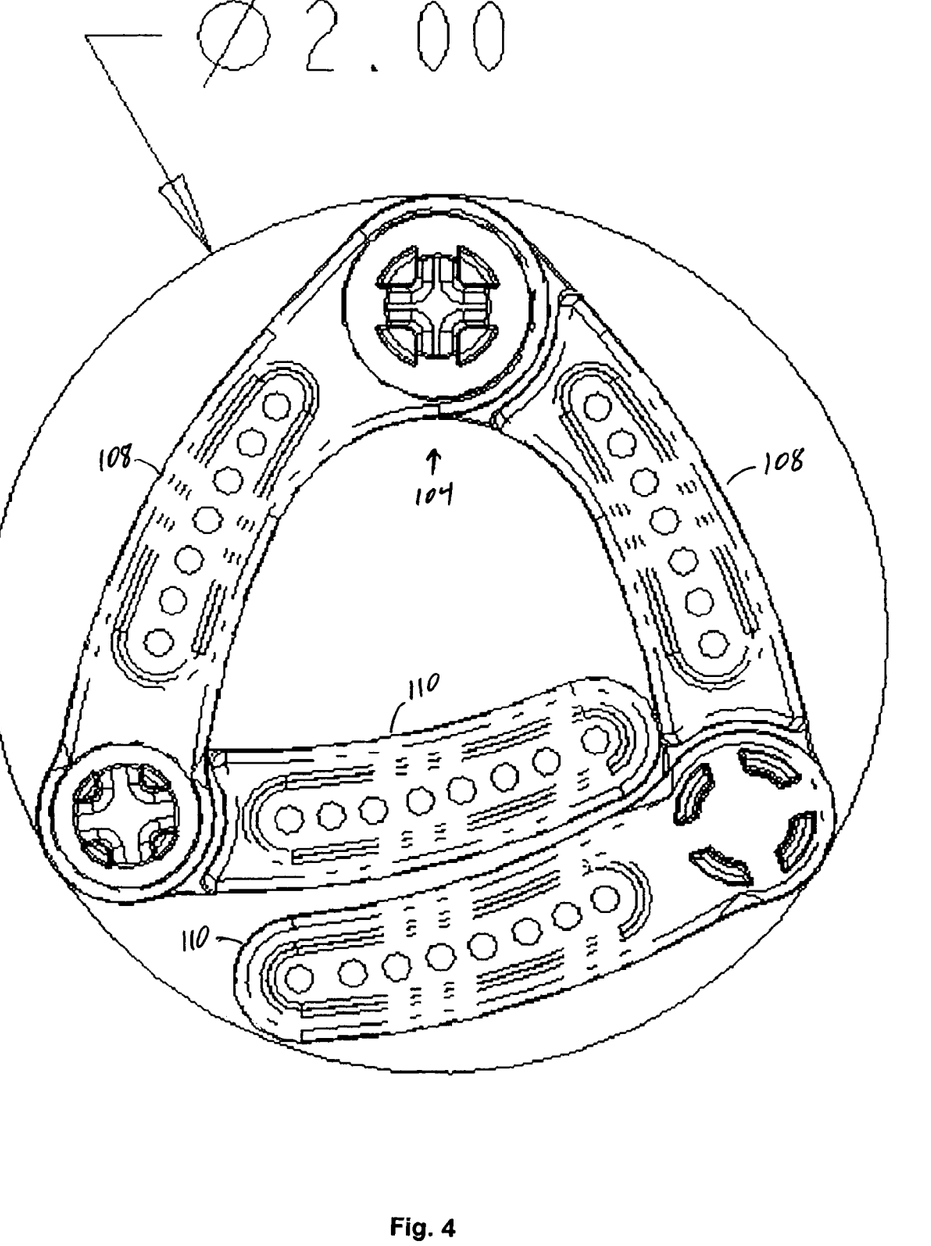
FIG. 4 illustrates an exemplary base folded into a two-inch pot having a pair of collapsible arms in accordance with the present invention.
Figure 5:
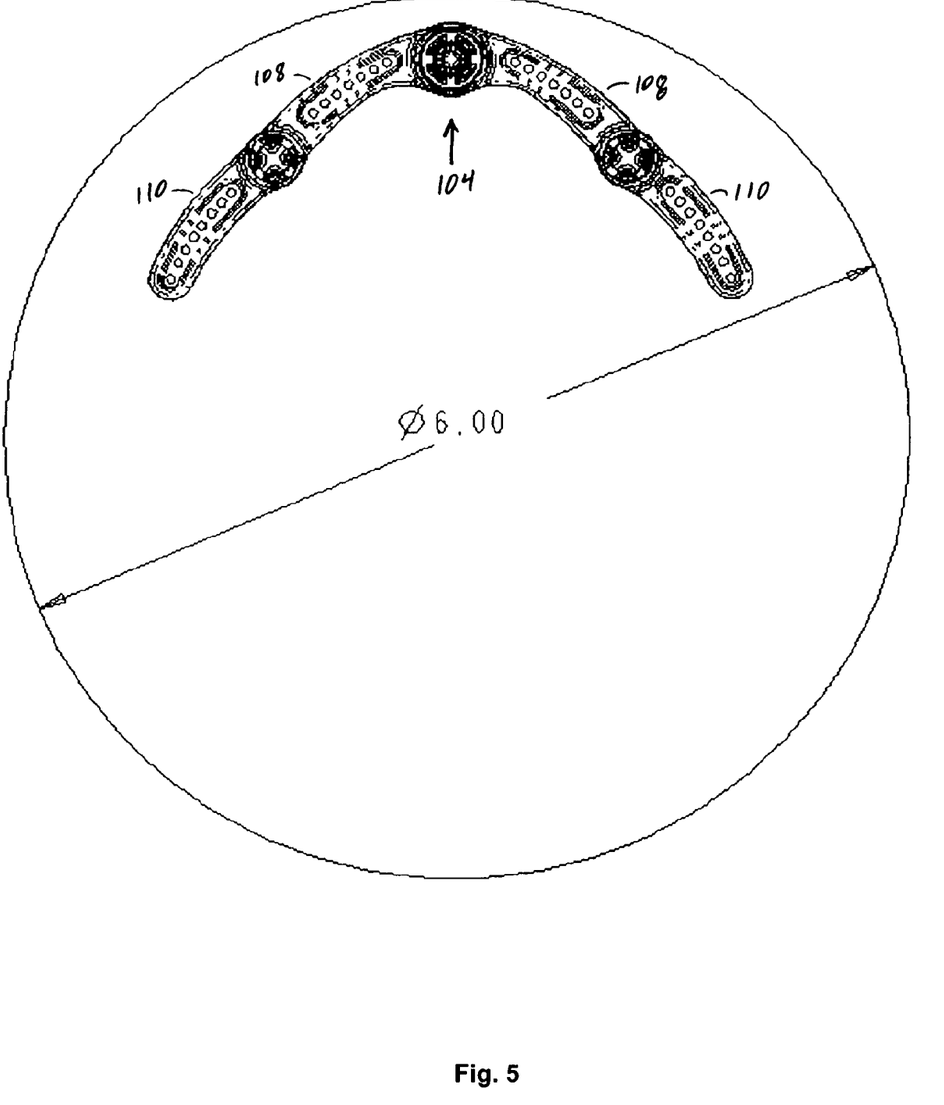
FIG. 5 illustrates an exemplary base extended within a six-inch pot.

For example, FIG. 4 shows base assembly 104 collapsed to fit within a two-inch diameter pot or space and FIG. 5 show base assembly 104 expanded within a six-inch diameter pot or space. The present invention may be configured to fit any convenient pot size or space, however, and is not limited by the illustrated embodiments.

Figure 6:
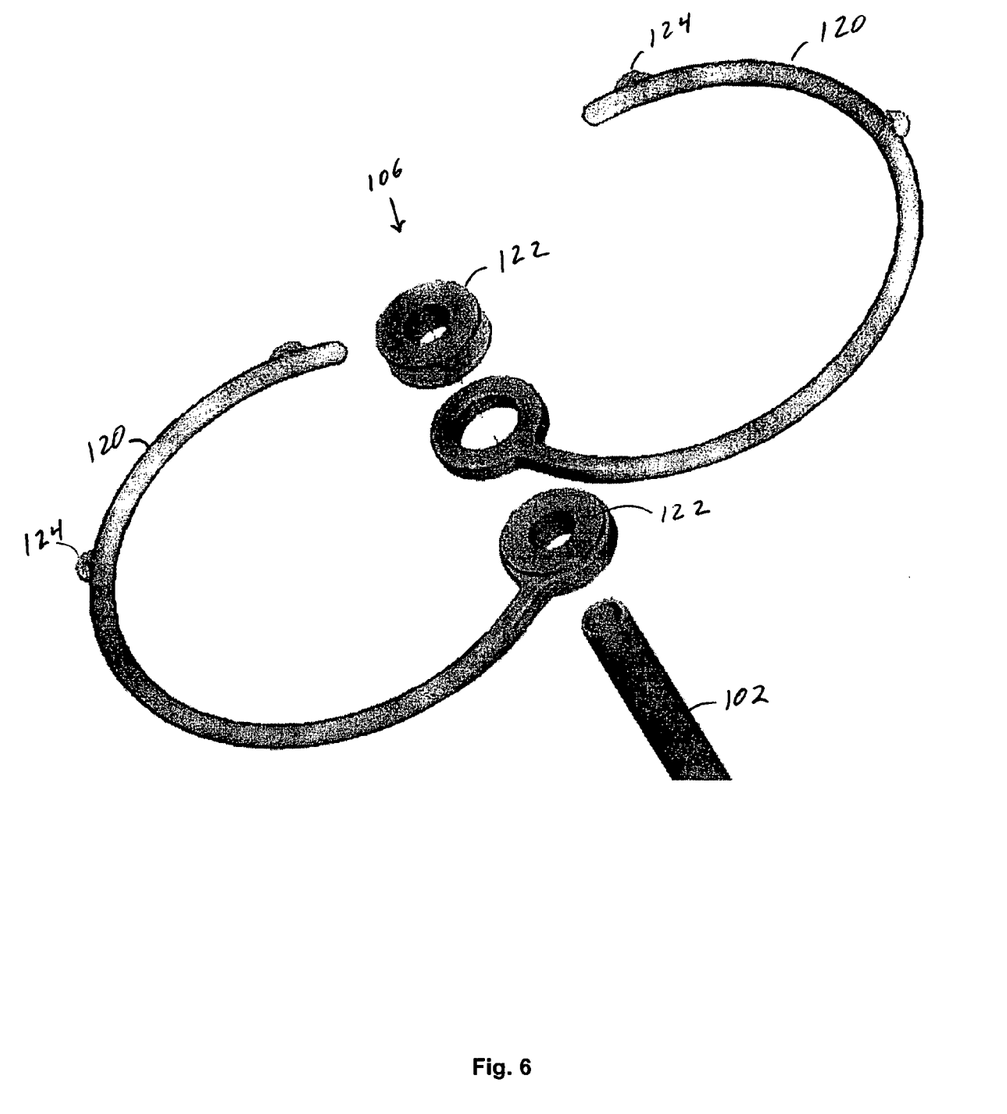
FIG. 6 illustrates the various components of an exemplary top assembly.

As shown in FIG. 6, top assembly 106 includes a pair of arms 120 that are configured to rotate about support rod 102. Arms 120 may also be adjusted along the length of support rod 102 to adapt to different size plants (and to accommodate the plant stems as they grow). Arms 120 may be rigid, semi-rigid, or deformable to support a plant.

In the illustrated embodiment, one or more grommets 122 may be inserted between support rod 102 and arms 120. Grommets 122 may be manufactured from any suitable material, e.g., plastic, rubber, or the like. Grommets 122 may fit loosely over support rod 102 to allow the arms to freely rotate or move up and down or may be sized to provide sufficient friction to maintain arms 120 in a given position on support rod 102. Grommets 122 may be inserted into openings in arms 120, and may then be slipped over support rod 102 to position arms 102.

Ridges, detents, or other features may be provided along support rod 102 to provide for incremental vertical adjustment of arms 120. Similarly, arms 120 or grommets 122 may include ridges, detents, or other features to provide for incremental rotation of arms 120. Anchors 124 may be formed at any number of points along arms 120 enabling arms 102 to be tied together or to the plant. Anchors 124 may include holes, hooks, or mounting points. Anchors 124 may include deformable wires that can be used to secure plant stems to arms 120. Anchors 124 on arms 120 may interlock to secure arms 120 in position; alternatively, arms 120 may be connected using string, elastics, tape, wire, and the like. A string or wire may thus be tied to arms 120, providing support for larger clusters of stems as might be required. Arms 120 may be adjusted to clutch or support any number of plants or to fit within a variety of spaces.

Figure 7:
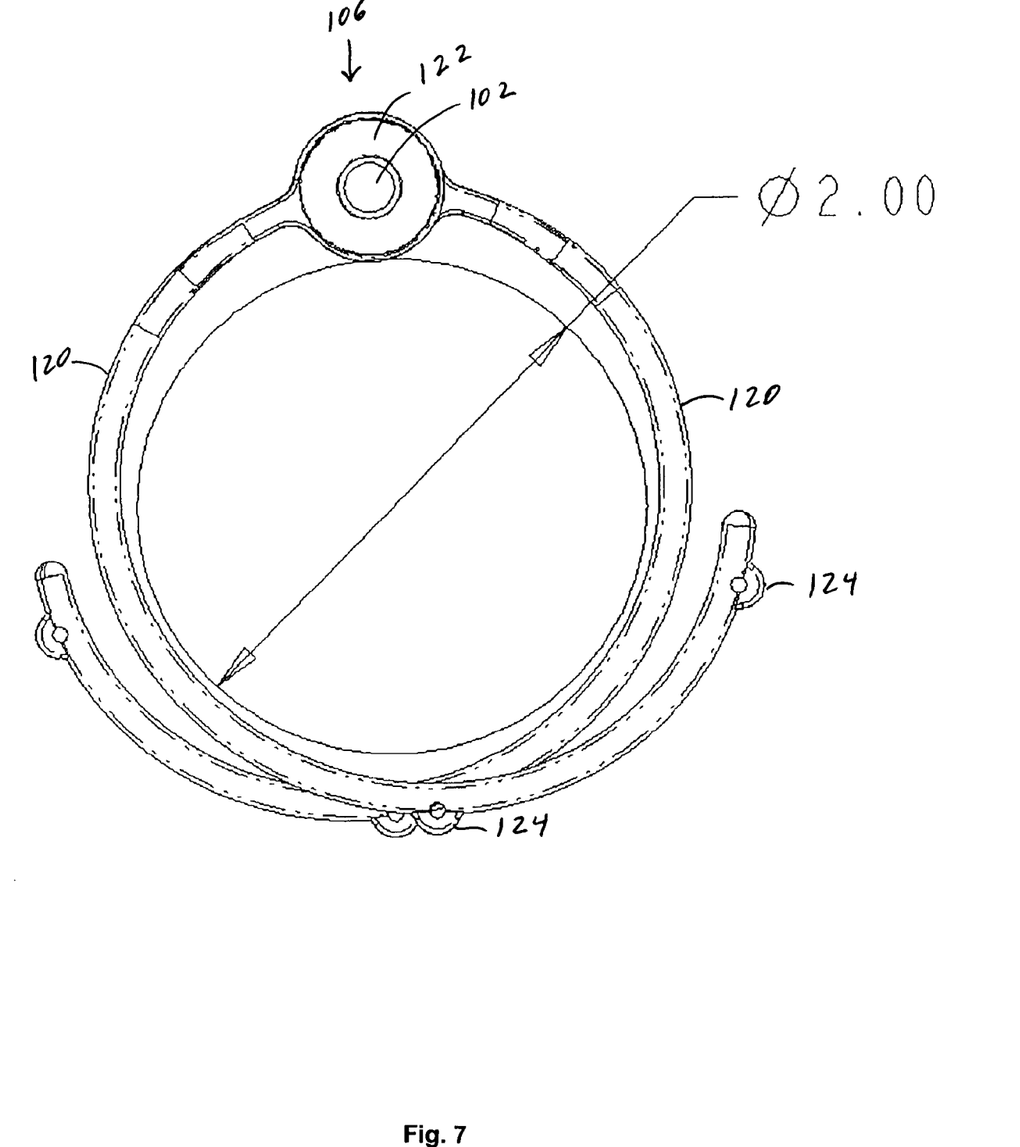
FIG. 7 illustrates the top assembly configured to support a two-inch cluster of stems.
Figure 8:
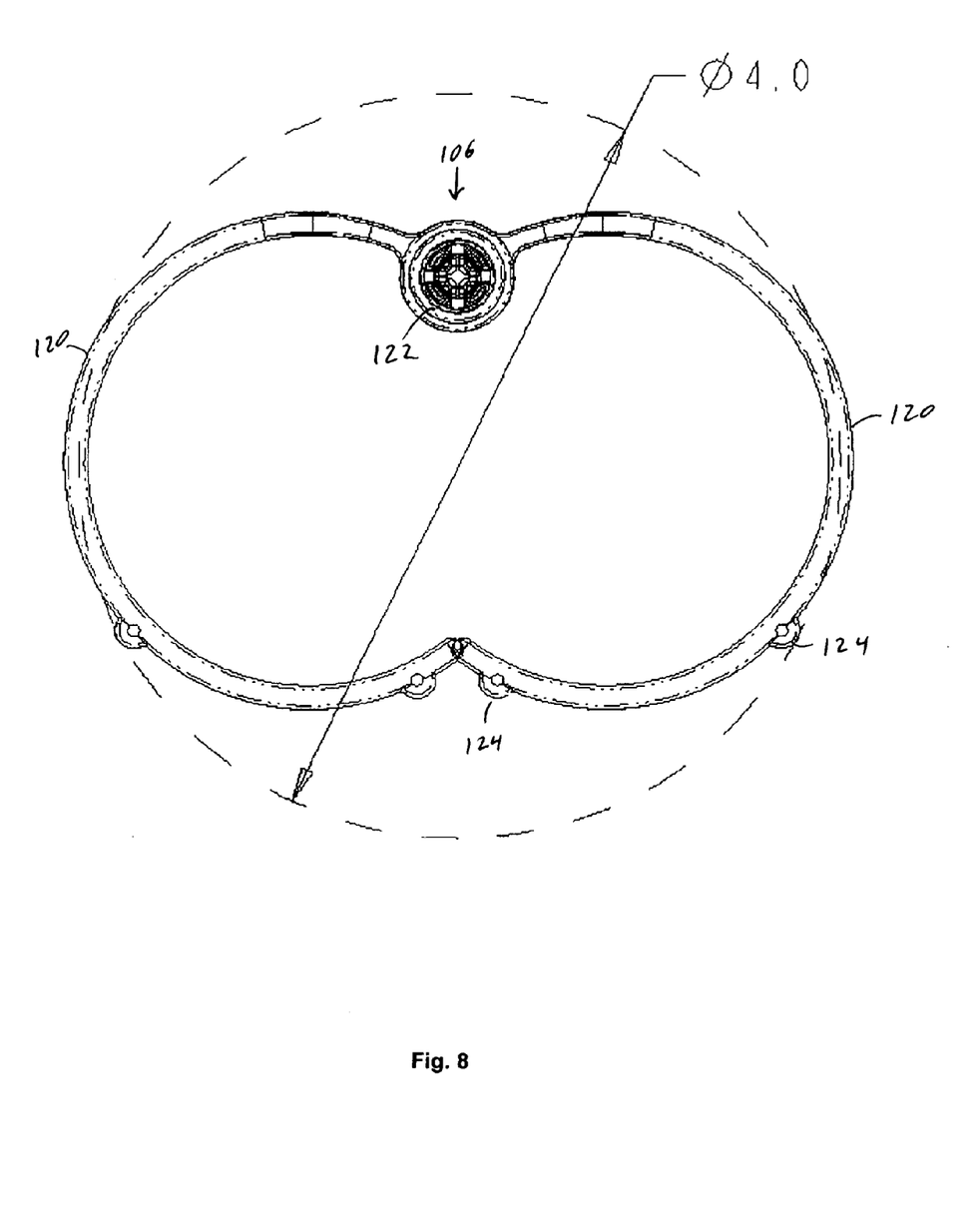
FIG. 8 illustrates the top assembly extended to hold a four-inch cluster of stems.
Figure 9:
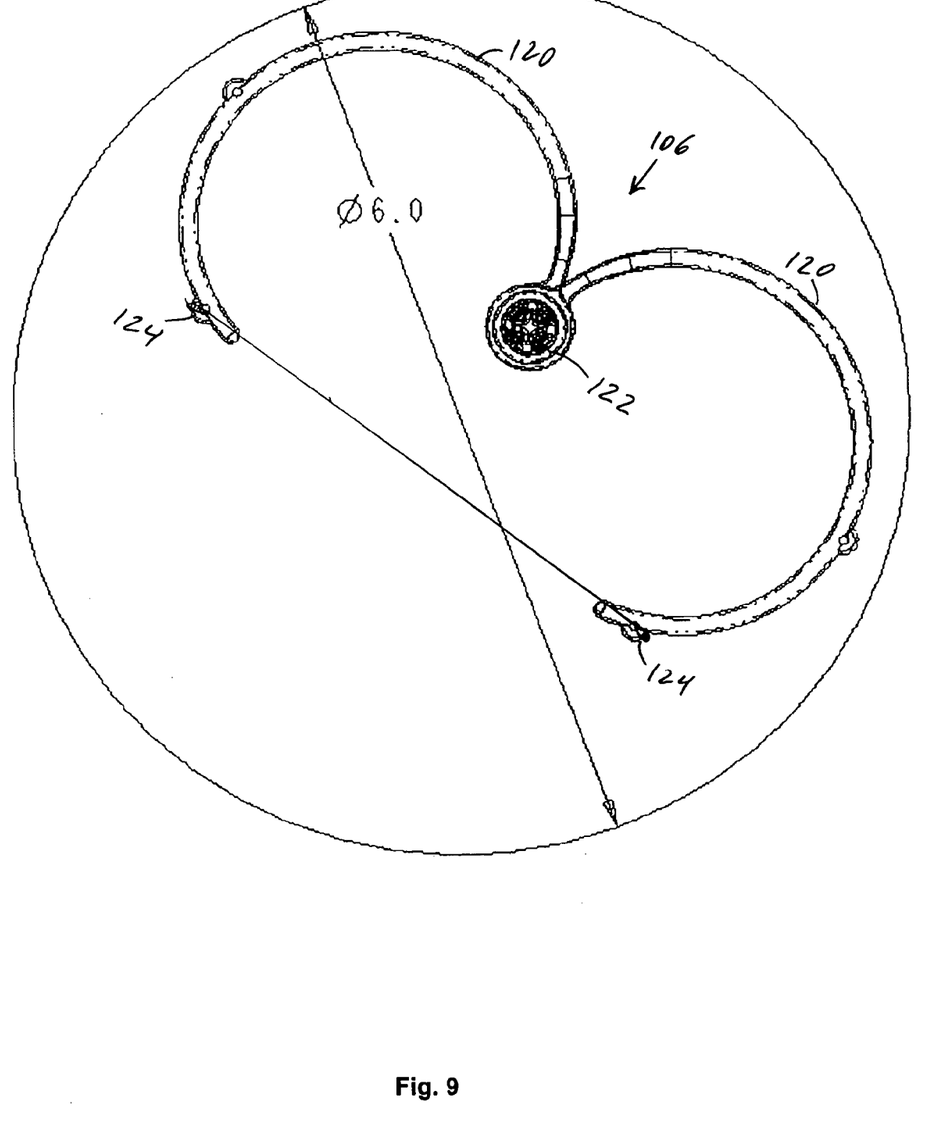
FIG. 9 illustrates the use of string in conjunction with the arms to hold a six-inch cluster of stems.

For example, FIGS. 7, 8 and 9 show top assembly 106 positioned to accommodate two-inch, four-inch, and six-inch clusters of stems, respectively. The present invention may be configured to fit any suitable range of stem clusters, however, and is not limited by the illustrated embodiments.

In various alternative embodiments, a plant watering system may be associated with any of the support rod 102, base assembly 104, and top assembly 106. For example, base assembly 104 may include a drip irrigation nozzle configured for attachment to conventional drip irrigation tubing. In various alternative embodiments, anchors 124 may serve to secure a sun hood or insect net over a plant.

In accordance with the above, the present invention provides a visually appealing stem support system that adjusts for different size pots as well as for different sizes and lengths of stems.

The present invention has been described above with reference to various exemplary embodiments. However, many changes, combinations and modifications may be made to the exemplary embodiments without departing from the scope of the present invention. For example, the various components may be implemented in alternate ways. These alternatives can be suitably selected depending upon the particular application or in consideration of any number of factors associated with the operation of the system. These and other changes or modifications are intended to be included within the scope of the present invention.

What is claimed is:

1. A plant stem support system that adjustably fits within a container, the plant stem support system comprising:
   a support having an upper end and a lower end and a length;
   a base assembly attachable to said lower end of said support;
   said base assembly further comprises a first articulated segment and a second articulated segment:
   wherein said first and second articulated segments each comprise an inner segment and an outer segment, wherein said inner segment is connected to said base assembly, and wherein said outer segment is pivotally connected to said inner segment;

and wherein said outer segments of said first and second articulated segments are pivotally adjusted to fit within different sizes of the container;

a top plant support assembly moveably associated with said support towards said upper end;

said top plant support assembly further comprises more than one arm, wherein at least one of said arms is pivotable about and slidable along said support; and at least one of said arms is capable of rotation about said support to accommodate clutching at least one of various number and size of plant stems.

2. The plant stem support system of claim 1, wherein at least one of said arms includes an anchor to facilitate at least one of attachment of a plant, attachment of a plant covering, and attachment together of said arms.

3. The plant stem support system of claim 2, wherein said anchor is deformable to secure a stem to one of said arms.

4. The plant stem support system of claim 1, further comprising a grommet between said top plant support assembly and said support, said grommet sized to frictionally secure at least a portion of said top plant support assembly in a position relative to said support.

5. The plant stem support system of claim 1, wherein at least one of said base assembly and said top plant support assembly is adjustable between about two inches and about six inches in diameter.

6. The plant stem support system of claim 1, wherein said length of said support is variable.

7. The plant stem support system of claim 1, wherein said top plant support assembly is deformable to secure plants with said top plant support assembly.

8. A plant stem support system comprising:
   a support rod with a bottom section and a top section;
   an adjustable base assembly with a set of arms, the bottom section of said support rod attached to said adjustable base assembly;
   wherein said set of arms of said adjustable base assembly each comprise an inner segment and an outer segment, and each of said inner and outer segments comprise a first end and a second end;
   wherein said first end of said inner segment is connected to said adjustable base assembly;
   wherein said second end of said inner segment is pivotally connected to said first end of said outer segment;
   wherein said outer segments are pivotally adjusted to form different sizes of said base assembly;
   an adjustable top support assembly with a set of arms pivotally connected to the top section of said support rod; and
   wherein said set of arms of said adjustable top support assembly are independently moveable about said support rod, and capable of remaining in a static position independent of the position of any other of said set of arms.

9. The plant stem support system of claim 8, wherein said plant stem support system further comprises:
   a grommet between said support rod and one of said set of arms to frictionally maintain one of said set of arms in position relative to said support rod; and
   an anchor on one of said set of arms to facilitate at least one of attachment of a plant to one of said set of arms, attachment together of said set of arms, and attachment of a cover over said plant.

10. The plant stem support system of claim 9 wherein each of said set of arms comprises an anchor to facilitate attachment of an elastic band and said arms are freely pivotable about said support rod such that said set of arms may expand as the plant grows.

11. A plant stem support system that adjustably fits within a container, the plant stem support system comprising:
   a support having an upper end and a lower end and a length;
   a top plant support assembly moveably associated with said support towards said upper end;
   a base assembly attachable to said lower end of said support;
   said base assembly further comprising a first articulated segment and a second articulated segment;
   connected to said inner segment;
   wherein said first and second articulated segments are attached to said base assembly; and
   wherein said outer segments of said first and second articulated segments are pivotally adjusted to fit within different sizes of the container.

12. The system of claim 11, wherein said top plant support assembly further comprises more than one arm, wherein at least one of said arms is pivotable about and slidable along said support, and wherein at least one of said arms is capable of rotation about said support to accommodate clutching at least one of various number and size of plant stems.

13. The system of claim 12 wherein said arms rotate to create clutch sizes between two inches and six inches in diameter.

* * * * *

UNITED STATES PATENT AND TRADEMARK OFFICE
CERTIFICATE OF CORRECTION

PATENT NO. : 7,377,073 B2
APPLICATION NO. : 11/380372
DATED : May 27, 2008
INVENTOR(S) : Robert Grunnah

It is certified that error appears in the above-identified patent and that said Letters Patent is hereby corrected as shown below:

In column 4, line 65, change the ":" to a ";".

In column 6, line 33, cancel the text "connected to said inner segment;" and insert the following:
--wherein said first and second articulated segments each comprise an inner segment and an outer segment, and wherein said outer segment is pivotally connected to said inner segment;--.

Signed and Sealed this

Eighth Day of June, 2010

David J. Kappos
*Director of the United States Patent and Trademark Office*